Feb. 24, 1953  D. M. SMITH  2,629,641
PISTON RING
Filed March 29, 1946

INVENTOR.
DALLAS M. SMITH

BY Brunings and Sutherland
ATTORNEYS

Patented Feb. 24, 1953

2,629,641

UNITED STATES PATENT OFFICE 2,629,641

PISTON RING

Dallas M. Smith, Kirkwood, Mo.

Application March 29, 1946, Serial No. 658,102

7 Claims. (Cl. 309—44)

This invention relates generally to piston rings and particularly to piston rings of the character employed in internal combustion engines.

The usual piston ring, as employed in an internal combustion engine, is required not only to prevent the passage of gases downwardly from the combustion space past the ring, but is also required to control the passage of oil up the cylinder wall from the crank case toward the combustion space. As a practical matter, however, the successful operation of many piston rings is attributable to the fact that the blow-by of combustion gases controls the oil and to that extent the second function of the ring is accomplished only at a sacrifice of the efficiency in accomplishing the first function.

In the fitting of a piston ring to the groove of a piston, it is universal practice to allow some clearance between the side walls (i. e., radial faces) of the piston ring and the side walls of the groove in which the ring operates. Such clearance is sufficient to give the ring freedom of action within the groove and may be on the order of several thousandths of an inch. The presence of such clearances, however, permits the ring to play in the groove and consequently to pass combustion gases along the side face of the ring to the rear thereof. Again, access of the pressures above the piston to the rear side of the ring has the desirable effect of increasing the pressure of the ring against the cylinder wall and consequently, so long as the gases under pressure do not leak from the rear of the ring, the practical result is not undesirable. The same action takes place on the down stroke of the piston, as, for example, on the intake stroke where negative pressures above the piston tend to cause the piston ring to hug the upper side of the ring groove and admit oil at the lower side and to the rear. In such cases, when the piston reverses its direction of movement, the back of the ring may be filled with oil, which may escape above the piston ring.

The object of the present invention, generally stated, is to provide a piston ring which will effectually seal the back side of the ring against the bottom of the ring groove and inhibit loss of pressure and loss of oil thereat.

Other objects will become apparent to those skilled in the art when the following description is read in connection with the accompanying drawings, in which.

Figure 1:
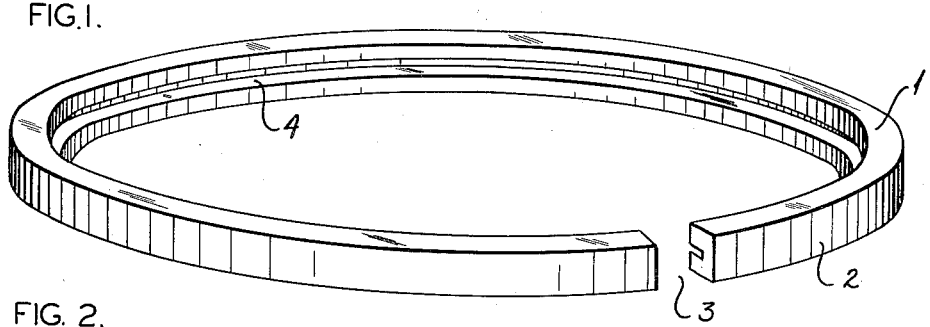
Figure 1 is a perspective view of the cylinder-engaging component of a piston ring constructed in accordance with the present invention.
Figure 2:
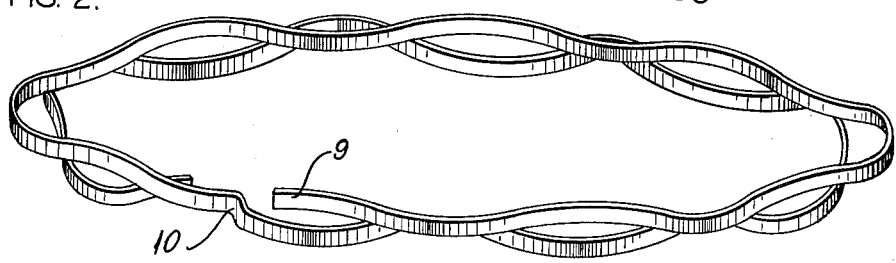
Figure 2 is a perspective view of an expander component of the piston ring of the present invention.

In accordance with the present invention, the packing ring assembly for use in a single groove of a piston is composed of a plurality of components, one of which is arranged to engage the wall of the cylinder, and another of which is arranged within the cylinder-engaging component to seat upon the bottom of the ring groove. The present invention especially contemplates that the cylinder-engaging component be provided on its inner periphery with a circumferential kerf adapted to receive a circumferential rib arranged on the other component. If desired, any suitable expander spring may be interposed between the inner and outer components of the ring assembly.

The invention especially contemplates that the seating of the rib on the inner component within the interior kerf of the outer component of the piston ring be accomplished in such manner as to effect a seal against the passage of gases or oil without interfering with the freedom of action of the cylinder-engaging ring within the groove. Such contemplates that the sealing be effected between different faces of the rib and the kerf as different conditions are encountered within the engine.

Referring now to Figures 1 to 5, inclusive, the cylinder-engaging component 1 of the piston ring assembly may be provided with a cylinder-engaging face 2, which, as shown, is substantially cylindrical, but will be understood as illustrative of any conventional cylinder-engaging compression ring surface. The ring 1 is provided with a gap 3, as shown, and on its interior is provided with a circumferentially extending kerf 4. The ring 1 is intended for use in an internal combustion engine cylinder of less diameter than the free ring shown in Figure 1, so that contraction of the ring (as reducing gap 3) is necessary to emplace the ring within the cylinder. Thereafter, the tendency of the ring to resume its original size causes a pressure to be exerted by the ring upon the cylinder wall.

Figure 3:
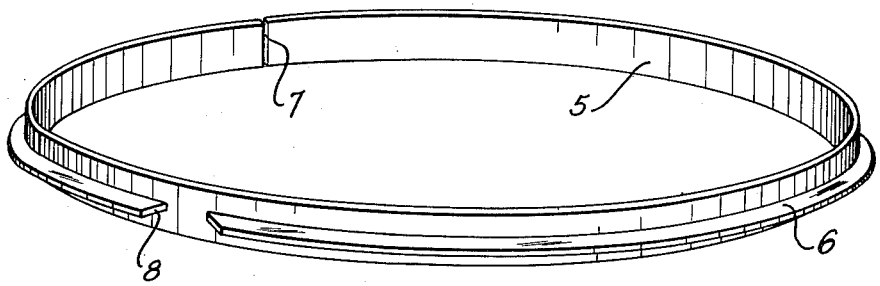
Figure 3 is a perspective view of the inner ring component of a piston ring constructed in accordance with the present invention.

The inner component of the ring is shown in detail in Figure 3 and consists of a T-shaped band 5 having a substantially cylindrical internal surface for seating against the bottom of the ring groove and arranged centrally about its exterior is a rib 6. Preferably the member 5 is formed of T-shaped stock so that the rib 6 is integral with the body of the ring. The internal member is likewise provided with a gap, as shown at 7, and, if it is desired to utilize a unitary expander element, the rib 6 may be interrupted, as shown at 8. Preferably, the internal component is so constructed that it tends to contract under its own resiliency in a direction such as would close gap 7. This requires temporary stretching of gap 7 in order to emplace the member 5 in the ring groove. However, when the ring is inserted in a ring groove and the stretching force released, it inherently tends to hug the bottom of the groove.

A two-turn expander element 9 is provided for interposition between elements 1 and 5. In the embodiment shown in Figure 2, the expander is formed of sinuously bent ribbon spring steel, the two turns thereof being interconnected at an offset 10 arranged to be accommodated by the interruption 8 in rib 6. In the embodiment shown, one turn of the expander is adapted to lie above the rib 6, the other therebelow, both being interposed between the exterior ring element 1 and the interior ring element 5, tending to bias said components away from each other.

Figure 4:
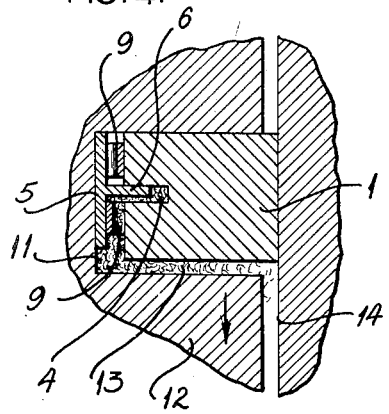
Figure 4 is a sectional view of the piston ring of the present invention when assembled in the ring groove of a piston in an internal combustion engine, the parts being shown in the position assumed by them on the intake stroke of the engine.

Referring now to Figure 4, the ring structure is shown mounted in a groove 11 of a piston 12 in the position assumed by them while the piston is traveling downwardly on the intake stroke of the internal combustion engine. In such circumstances, a clearance 13 (shown in exaggerated proportions in Figure 4) exists between the lower side face of the piston ring and the adjacent wall of the groove 11. During downward movement of the piston, oil will be scraped from the cylinder wall 14 and pass into the space 13 to the back of ring 1. In these circumstances, the pressure of the oil accumulating back of the ring 1 will tend to move the internal ring component 5 axially upward until rib 6 seats against the upper wall of kerf 4, whereupon further pressure exerted by the oil entering at 13 will be resisted by the seal thus formed within the kerf 4 and the sealing action of component 5 against the bottom of the ring groove.

As the piston reverses direction at the bottom of the downstroke, the ring 1 will lag (due to frictional drag against the cylinder) until it is engaged by the lower side wall of groove 11. Such shifting of the ring from the top to the bottom of the groove will be accompanied by a shifting of component 5 (if as shown in Figure 4 the rib 6 had been in engagement with the upper wall of kerf 4) so that the back seal is maintained against the upper wall of the kerf. When the upward movement has progressed substantially, the parts will assume the position indicated in Figure 5 of the drawings. Here the parts are shown in the position assumed by them during the compression stroke of the engine. In such circumstances, the lower face of the ring 1 will be in snug engagement with the lower ring land (so that clearance 13 is eliminated) thus providing a clearance 15 (the proportions of which are exaggerated in Figure 5) at the upper side of the ring, which admits combustion gases to the rear of ring 1. Under such circumstances, the force of the gases moves the inner component 5 axially within the groove until the lower surface of rib 6 seats against the lower wall of kerf 4 and, together with the seating of component 5 against the bottom of the ring groove, effects a seal against the passage of the combustion gases around behind the ring.

Figure 5:
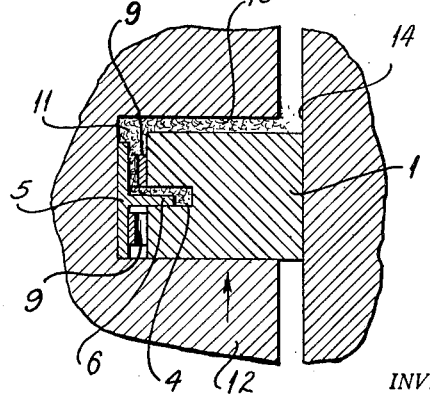
Figure 5 is a view, at the same cross section as Figure 4, but showing the parts in the position assumed by them on the compression stroke of the engine.

When the piston reverses and starts its downstroke, the ring 1 may lag and shift into engagement with the upper wall of groove 11 (maintaining the seal between rib 6 and the lower wall of kerf 4) until the explosion within the cylinder may force the parts back to the position shown in Figure 5 during the power stroke. Or, if the gas pressure is not transmitted in sufficient magnitude through the cylinder-wall-piston-head interspace, the parts will assume the position shown in Figure 4 on the power stroke. In either event, the back seal between kerf 4 and rib 6 is effective to reduce blow-by.

In the embodiments illustrated in Figures 4 and 5, the operation is dependent upon some slight relative axial movement between the inner component 5 and the ring groove 11, as the conditions of operation change. Consequently a clearance (greatly exaggerated in Figures 4 and 5) is allowed between the edges of component 5 and the side walls of the ring groove 11. Some clearance (exaggerated in Figures 4 and 5) is also allowed between rib 6 and kerf 4. The latter clearance is preferably small, being only sufficient to assure that the interengagement of such parts will not interfere with the freedom of action of the ring 1 within groove 11.

Since, for the sake of clarity in disclosure, the various clearances are shown in exaggerated proportions in the drawings, it is desirable to give a typical set of finite values therefor. For example, if the width of the ring groove 11 (i. e., the axial distance between the lands of the piston) is 0.0950 ± .0005 inch, the ring 1 may have an axial dimension of 0.0930 to 0.0935 inch and the axial dimension of component 5 may be 0.087 to 0.089 inch. If the kerf 4 has an axial dimension of 0.0205 to 0.0210 inch, the rib 6 may have an axial dimension of 0.019 to 0.020 inch. Alternately, the component 5 may be closely fitted to the groove, and freedom of action in ring 1 accomplished by increased clearance between kerf 4 and rib 6. The latter arrangement is particularly adaptable where ring 1 is of the torsional type.

From the foregoing description, those skilled in the art will understand the construction, operation, and advantages of the piston ring structure disclosed. While one complete embodiment has been disclosed in detail and suggested variations indicated, it is not to be understood that the invention is limited to the details of such disclosure, but on the contrary, it is contemplated that many modifications and variations be made without departing from the spirit of the invention or the scope of the appended claims.

Having thus described the invention, what is claimed and desired to be secured by Letters Patent is:

1. A packing combination for use on a piston having a groove, comprising a cylinder-engaging ring having a kerf in its inner periphery, and a complementary inwardly contractile ring having a circumferential rib about its outer periphery, said complementary ring having flanges extending axially from said rib in substantially parallel relation with but permanently spaced from the inner periphery of said cylinder-engaging ring, and said complementary ring having greater axial clearance in said groove than said first ring and than said rib in said kerf.

2. In combination with a piston having a groove, a packing ring comprising a pair of ring members, one of which expands against the wall of the cylinder and the other of which contracts around the periphery of the bottom of the piston groove, the outwardly expanding member having a circumferential groove about its inner periphery, the inwardly contracting member having a circumferential rib about its outer periphery and having flanges extending axially from said rib in substantially parallel relation with the inner periphery of said outwardly expansible member, said rib loosely fitting into the groove in the outwardly expanding member, and an expander spring arranged between said ring members to permanently space the same in the radial direction, said expander having a plurality of resilient parts, one of said resilient parts being disposed between the two ring members below and one above the rib of the inwardly contracting ring member.

3. In combination with a piston having a groove, a packing ring comprising a pair of ring members, one of which expands against the wall of the cylinder and the other of which contracts around the periphery of the bottom of the piston groove, the outwardly expanding member having a circumferential square groove around the center of its inner periphery, and the inwardly contracting member being a band of ribbon steel with a circumferential rib around the center of its outer periphery, said rib being interrupted between the heel and gap of the ring member, and an expander comprising a band of resilient ribbon steel of a length such as to constitute two turns, said ribbon, intermediate its ends, being offset to an extent corresponding at least to the width of the rib of the inner ring member, said expander disposed between the inner and outer ring members in such a manner that one turn of the expander is positioned above the rib of the inner member, and one turn of the expander is positioned below the rib of the inner member, with said offset arranged at the interruption in said rib.

4. In a packing for use with an internal combustion engine piston having a groove wherein the packing includes a cylinder-engaging ring having a lesser axial dimension than that of the groove, said ring having a radially extending kerf in its inner periphery and a T-shaped inwardly contractile ring arranged with its stem extending radially into said kerf and its head extending in the axial direction radially within said cylinder-engaging ring, the improvement which comprises, the head of said T-shaped ring being of lesser axial dimension than the groove, and means for permanently spacing said head from the inner periphery of the cylinder-engaging ring, to permit axial movement of the T-shaped member within the groove to an extent such that irrespective of the axial position of the cylinder-engaging ring the T-shaped member is free to engage one wall of the kerf.

5. In an internal combustion engine, a piston ring construction to prevent "blowby" comprising a ring section having a circumferential groove throughout its concave length, a shoe bottomed on the bottom of the piston ring groove of the piston, said shoe having tongue means entered in the groove of the ring section, and expansive means between the ring section and shoe to urge the ring section against the cylinder wall and the shoe against the piston ring groove bottom, said tongue means making surface contact alternately with the opposite walls of the ring section groove as the piston reciprocates to thereby effectively seal the space between the ring section and tongue.

6. In a packing for use with an internal combustion engine piston having a groove, wherein the packing includes a cylinder-engaging ring having a lesser axial dimension than that of the groove, said ring having a radially extending kerf in its inner periphery, and a T-shaped inwardly contractile ring arranged with its stem extending radially into said kerf and its head extending in the axial direction radially within said cylinder-engaging ring, the improvement which comprises, the head of said T-shaped ring being substantially radially spaced from the inner periphery of said cylinder-engaging ring, the stem of said T-shaped ring being sufficiently less in axial dimension than said kerf that when one face of said stem is in contact with the adjacent wall of said kerf the opposite face of said stem is free of contact with its adjacent wall of said kerf.

7. In combination with a piston having a groove, a packing ring comprising a pair of ring members, one of which expands against the wall of the cylinder and the other of which contracts around the periphery of the bottom of the piston groove, the outwardly expanding member having a circumferential groove about its inner periphery, the inwardly contracting member having a circumferential rib about its outer periphery and having flanges extending axially from said rib in substantially parallel relation with the inner periphery of said outwardly expansible member, said rib loosely fitting into the groove in the outwardly expanding member, and means for maintaining a radially spaced relationship between the inner periphery of said outwardly expanding member and the outer periphery of said inwardly contracting member.

DALLAS M. SMITH.

REFERENCES CITED

The following references are of record in the file of this patent:

UNITED STATES PATENTS

| Number | Name | Date |
|---|---|---|
| 1,207,198 | Mummert | Dec. 5, 1916 |
| 1,515,829 | Brownfield | Nov. 18, 1924 |
| 1,595,855 | Clark | Aug. 10, 1926 |
| 1,600,417 | McNeal | Sept. 21, 1926 |
| 1,933,943 | Towell | Nov. 7, 1933 |
| 2,228,495 | Williams | Jan. 14, 1941 |
| 2,362,673 | Smith | Nov. 14, 1944 |